United States Patent [19]

Pera

[11] Patent Number: 5,544,836
[45] Date of Patent: Aug. 13, 1996

[54] EXTENSIBLE AND SELF-RETRACTABLE CABLE DEVICE

[75] Inventor: Ivo E. Pera, Pembroke Pines, Fla.

[73] Assignee: Lloyds International Trust, Hollywood, Fla.

[21] Appl. No.: 253,947

[22] Filed: Jun. 3, 1994

[51] Int. Cl.⁶ .................................................. B65H 75/48
[52] U.S. Cl. ...................................... 242/372; 242/378.1
[58] Field of Search .............................. 242/378, 378.1, 242/378.2, 378.3, 378.4, 372, 388.1, 388.5

[56] References Cited

U.S. PATENT DOCUMENTS

| | | | |
|---|---|---|---|
| 447,889 | 3/1891 | Matteson | 242/378.3 |
| 1,203,562 | 11/1916 | Adamson | 242/378.3 |
| 1,455,715 | 5/1923 | Danese | 242/378.3 |
| 1,941,880 | 1/1934 | Earll | 242/372 |
| 3,224,706 | 12/1965 | Bastow | 242/378.1 |
| 4,390,142 | 6/1983 | Cheng | 242/388.1 |
| 4,733,832 | 3/1988 | Napierski | 242/378 |
| 5,094,396 | 3/1992 | Burke | 242/378.2 |
| 5,114,091 | 5/1992 | Peterson et al. | 242/378.3 |

FOREIGN PATENT DOCUMENTS 478803  1/1938  United Kingdom ............... 242/378.2

Primary Examiner—John M. Jillions
Attorney, Agent, or Firm—Malin, Haley, Dimaggio & Crosby, P.A.

[57] ABSTRACT

An extensible and self-retractable cable device is provided comprising, in one embodiment, a casing having winding cable, two reels, two spring housings, and two springs mounted within the casing. The device enables the manual withdrawal and automatic re-entry of a telephone cord connecting the handset to the base of a telephone set, thus, preventing the telephone cord from becoming crinkled and coiled up in an objectionable manner.

11 Claims, 13 Drawing Sheets

5,544,836

EXTENSIBLE AND SELF-RETRACTABLE CABLE DEVICE

BACKGROUND OF THE INVENTION

1. Field of the Invention

The present invention relates generally to telephone cords and more specifically to improvements in self winding reels for tape containing conductors for a telephone hand piece or for electronic and electrical components with similar scope.

2. Description of the Prior Art

Telephone handset or handpiece cords have typically been provided in spirals so they may be stretched out for use with the flexibility of the spiraled cord permitting it to retract partially to a more manageable length when not in use. These cords, however, readily become twisted and tangled. To overcome the disadvantages of these conventional telephone cords, retractable cord devices have been proposed. One such device is U.S. Pat. No. 4,646,987, issued to Peterson.

U.S. Pat. No. 4,646,987 discloses tape containing communication conductors for the automatic rewinding of a cable on a reel rotated by a coil spring positioned within a bore disposed in the reel. Though the Peterson device overcomes some of the problems of conventional telephone cords, the device provides additional drawbacks in conjunction with the use of the device. The position of the preloaded return coil spring has various disadvantages, particularly during the rewind of the cable on the reel due to the bending of the supporting pin, avoiding the cable to wound completely from reduced spring force.

Thus, what is needed in the art is a cable device which allows a predetermined amount of cable to drawn out from either end, to reach the desired length and when the handset is returned to its base or support the cable will automatically and completely retract inside the housing or casing of the device. It is, therefore, to the effective resolution of the aforementioned problems and shortcomings that the present invention is directed.

SUMMARY OF THE INVENTION

An extensible and self-retractable cable device is provided for use with telephone, electronic, and electrical equipment. The present invention enables the manual withdrawal and automatic re-entry of a flat telephone cord connecting the handset to the base of a telephone set, thus, preventing the telephone cord from becoming crinkled and coiled up in an objectionable manner.

The preferred embodiment of the present invention provides cable reels of relatively simple construction comprising a casing having a winding cable, two reels, two spring housings, and two springs mounted within the casing. The present invention allowing a predetermined amount of telephone cord (winding cable) to be drawn out at either end, to reach the desired length during a phone conversation. When the call is effected and the handset replaced onto the telephone base, the telephone cord will automatically retract inside the casing.

One end of the cable leads to the base of the telephone and the other end leads to handset or handpiece. By pulling the hand set away from the telephone base, the cord is fed out of the casing, with continuing lead on the return spiral spring inside the spring housing. If the pull (tension) is interrupted, the cord ends are automatically wound back inside the casing of the device.

Accordingly, it is an object of the present invention to provide an extensible and retractable cord device adapted to wind a cord, such as a telephone cord, onto reels enclosed within a small compact casing, in which the cord may be stored and withdrawn against spring action, and in which the cord is held against retraction when the cord is extended out with a very light pulling.

It is another object of the present invention to provide an extensible and retractable cord device where the entire cord may be wound completely by a spring when the handset is positioned on a telephone base.

It is yet another object of the present invention to provide an extensible and retractable cord device which offers the advantages of shortening the telephone handpiece cord to a minimum while also extending the cord to any desired length.

It is even still another object of the present invention to provide an extensible and retractable cord device which is simple in construction, inexpensive to manufacture, easy to install, efficient in operation, durable in use, and attractive in appearance.

In accordance with these and other objects which will become apparent hereinafter, the instant invention will now be described with particular reference to the accompanying drawings.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENTS

Figure 1:
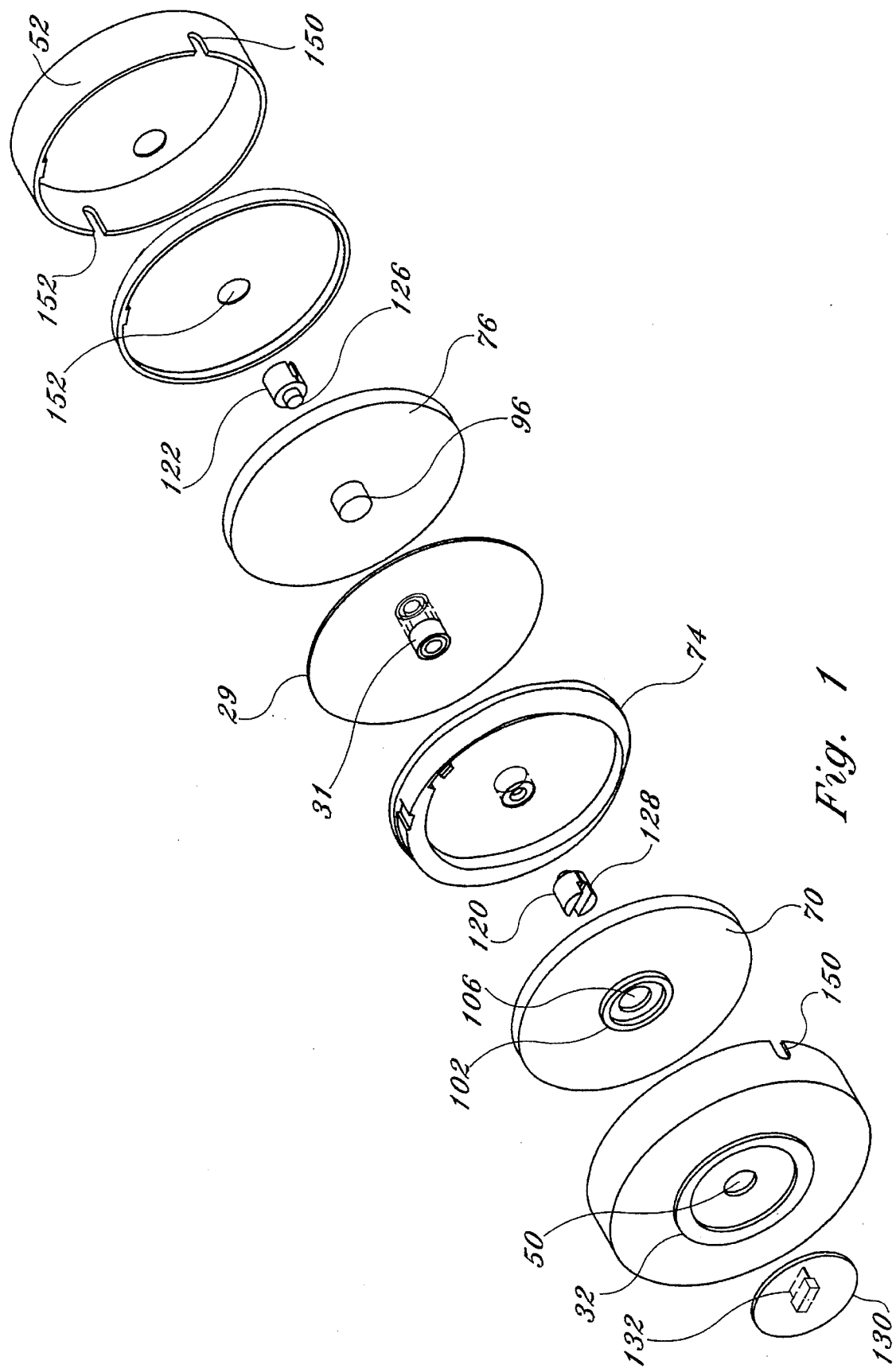
FIG. 1 is an isometric exploded view of the first embodiment of the present invention.

As seen in FIGS. 1 through 8, the first extensible and self-retractable cable device embodiment of the present invention is generally shown at 10. Cable device 10 generally, consists of a flat cable or tape, commonly referred to as a telephone cord 12, casing or housing 14, springs 16 and 18, spring housings 20 and 22, and divider 29. Cord 12 has a first modular jack 13 attached at one end and a second modular jack 15 attached at the opposite end of cord 12 by conventional means.

Casing 14 includes a first shell 30 and a second shell 40. A first and second protrusion 32 and 42 extend from the outer surface of shells 30 and 40, respectively, to define respective cap receiving cavities 34 and 44. Extending from the inner surface of shells 30 and 40, are third and fourth protrusions 36 and 46, respectively. Protrusions 36 and 46 define spacer receiving cavities 38 and 48, respectively. The function of cavities 36, 38, 46 and 48 will be discussed in further detail below. Apertures 50 and 52 extend through shells 30 and 40, respectively, and provide communication between cap receiving cavities 34, 44 and respective spacer receiving cavities 38, 48.

Figure 2:
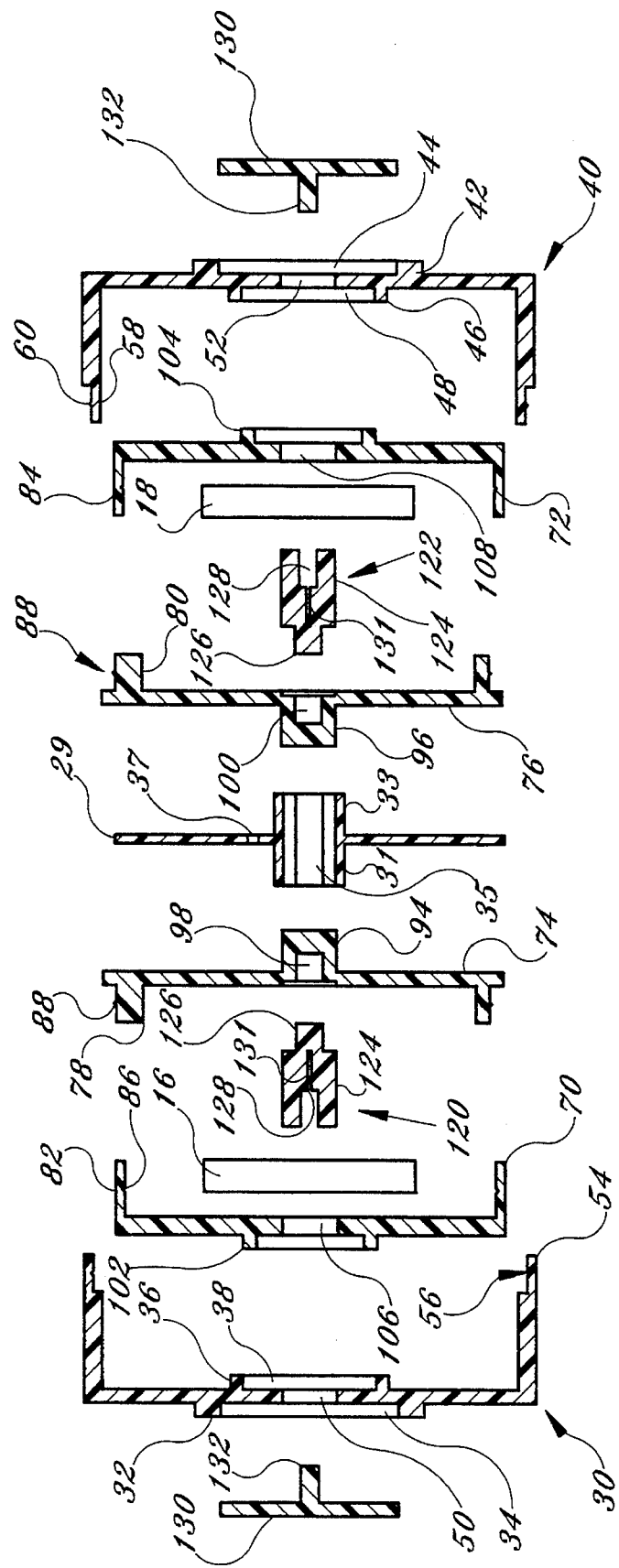
FIG. 2 is a sectional exploded view of the first embodiment of the present invention.
Figure 3:
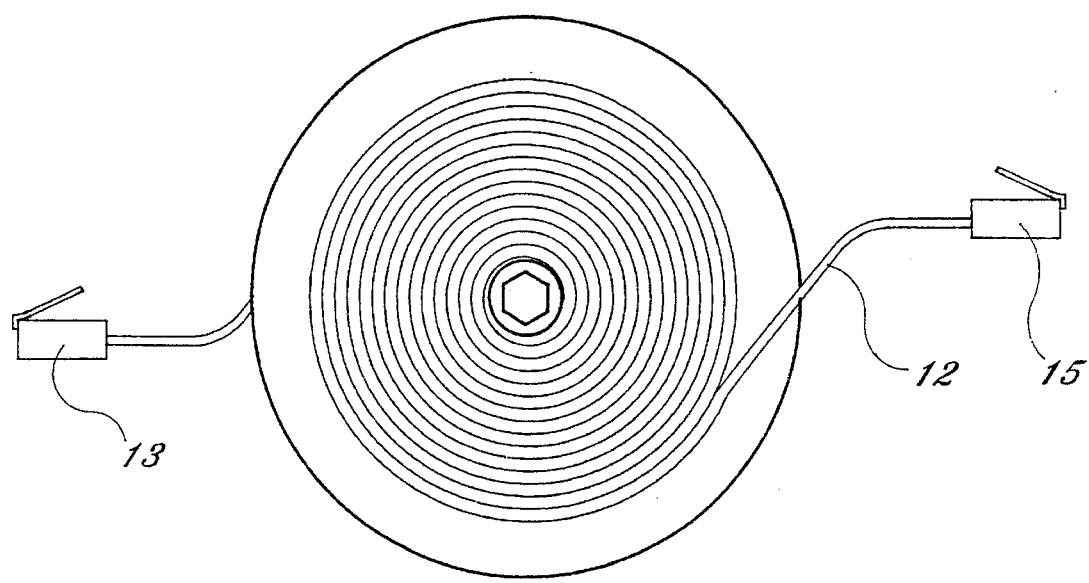
FIG. 3 is a sectional view of the first embodiment of the present invention.
Figure 4:
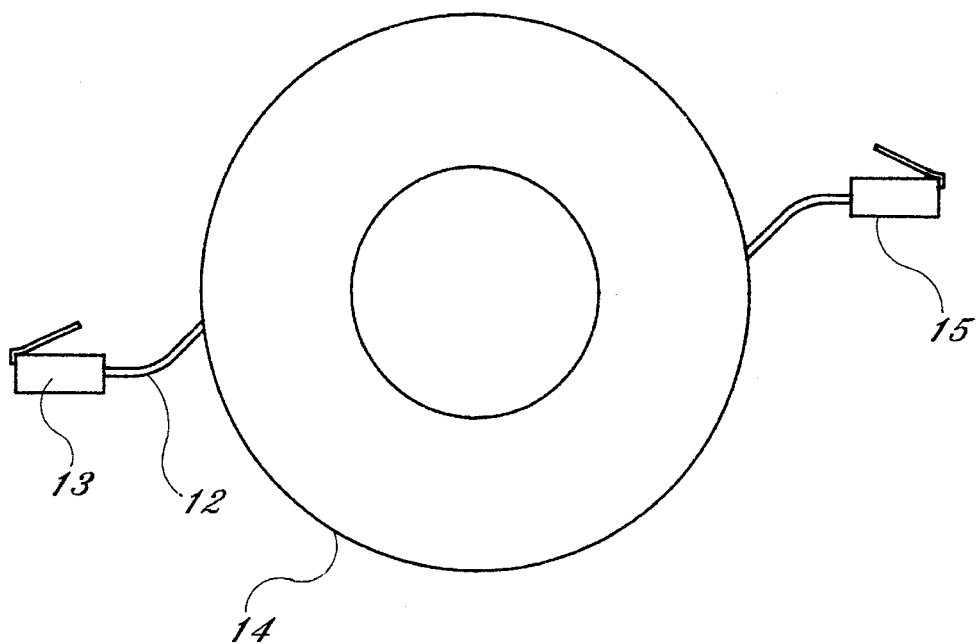
FIG. 4 is a side elevational view of the first embodiment of the present invention.
Figure 6:
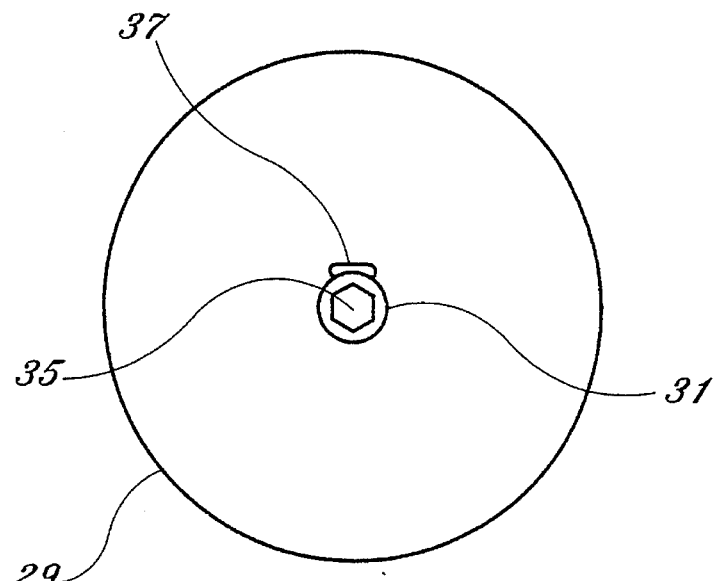
FIG. 6 is a side elevational view of the divider member of the first embodiment of the present invention.
Figure 5:
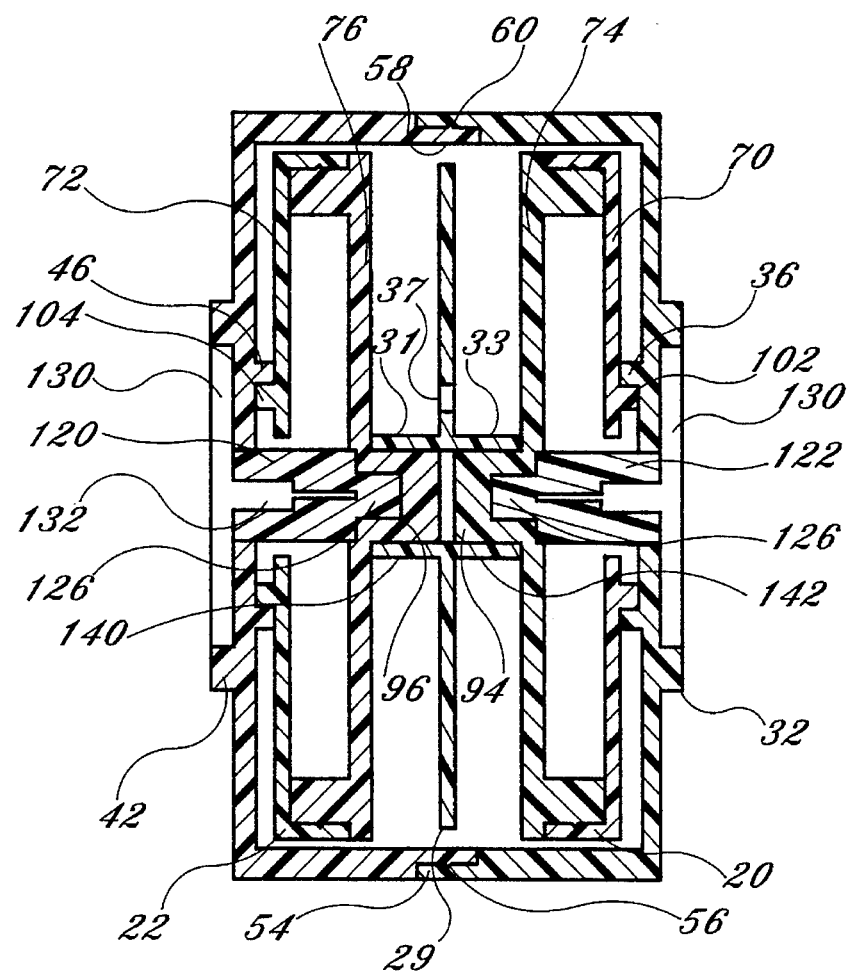
FIG. 5 is a side sectional view of the first embodiment of the present invention.
Figure 7:
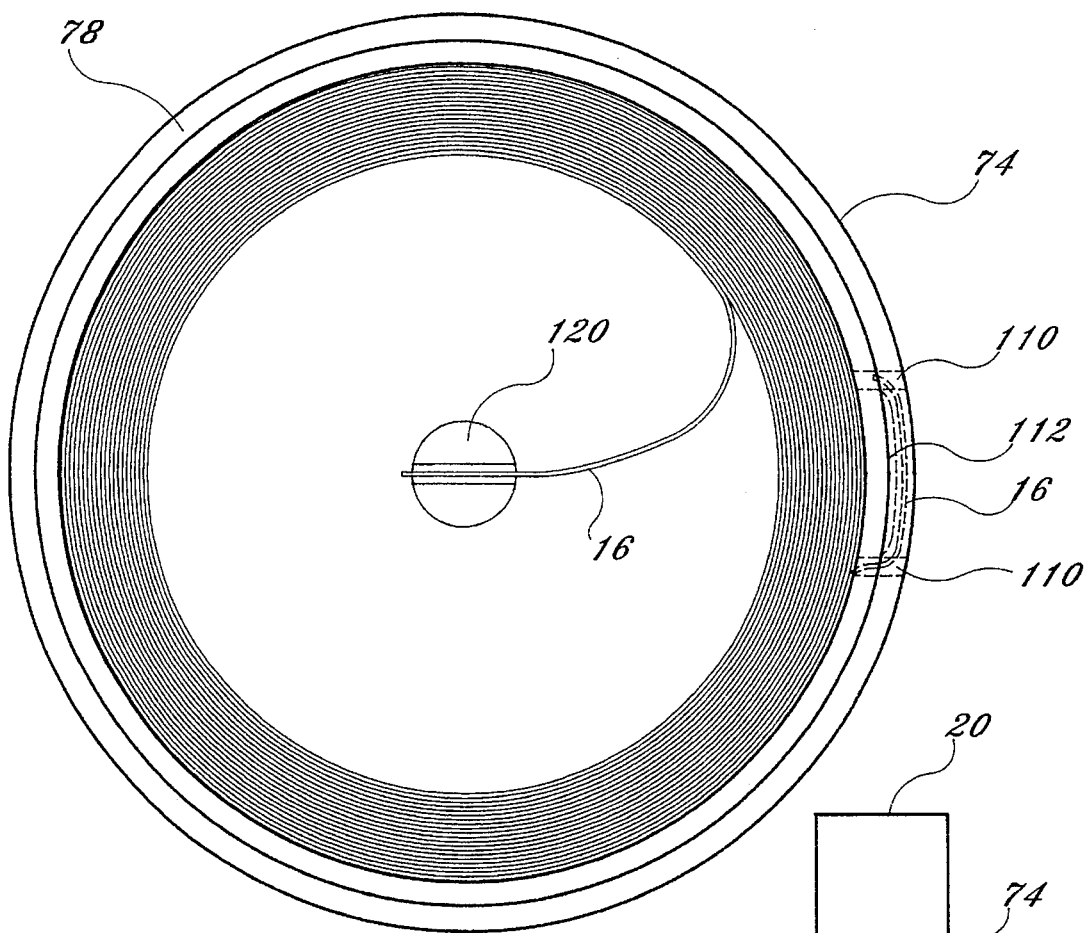
FIG. 7 is a side sectional view of the spring housing member of the first embodiment of the present invention.
Figure 8:
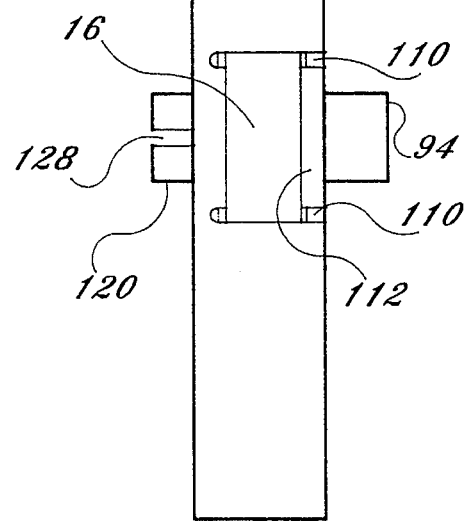
FIG. 8 is a top view of the spring housing member of FIG. 7.
Figure 9:
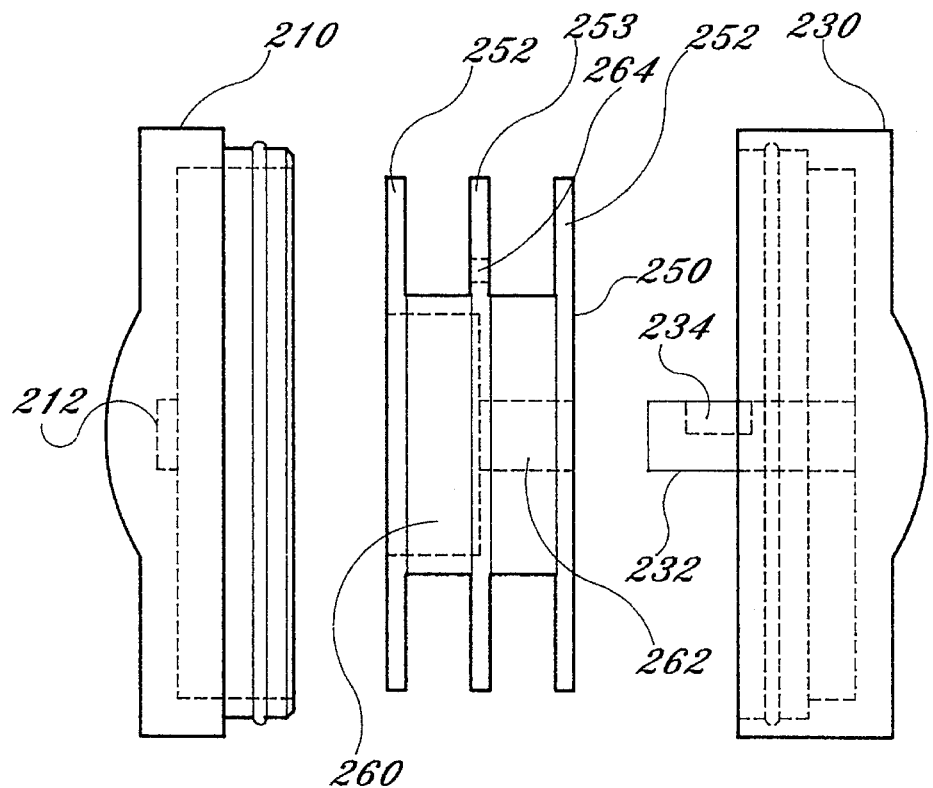
FIG. 9 is a side exploded view of the second embodiment of the present invention.
Figure 10:
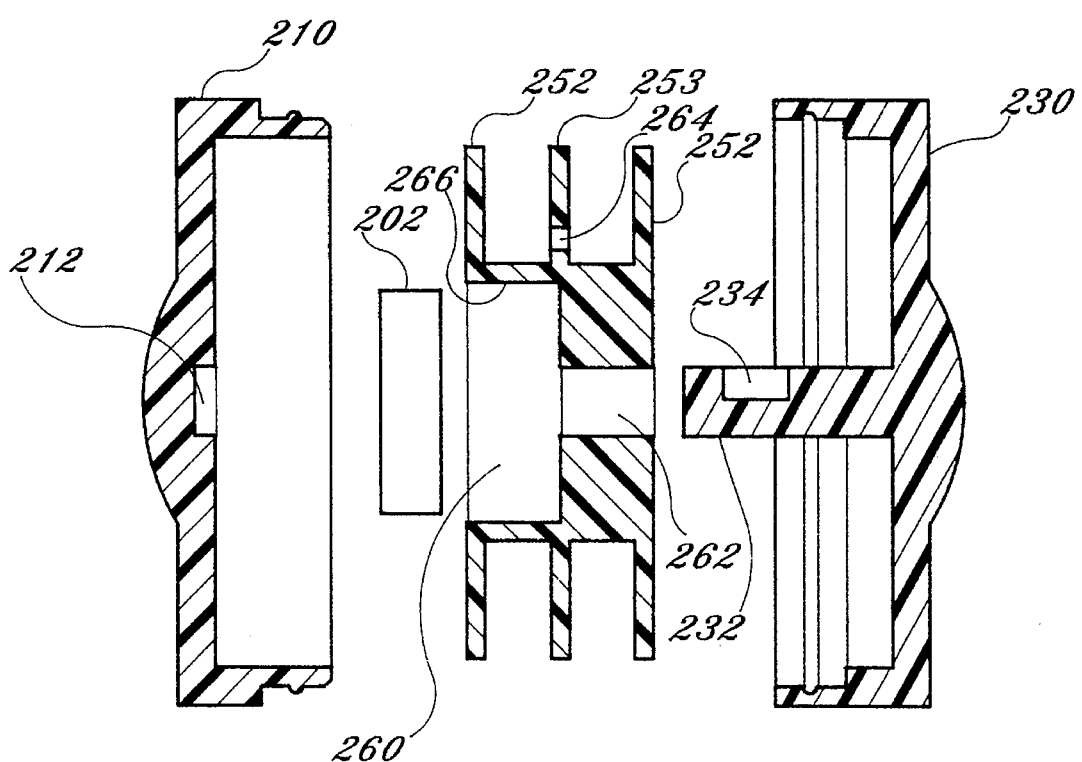
FIG. 10 is an exploded sectional view of the present invention shown in FIG. 9.

Shell 30 can be attached to shell 40 in various ways. As seen in FIG. 2, shell 30 can be provided with an outer ledge member 54 having a groove 56 disposed within a portion thereof and shell 40 can be provided with an inner ledge member 58 having indent 60 corresponding to the shape of groove 56. To attach the shells to each other, inner ledge 58 is inserted within the area defined by shell 30, until indent 60 mates with groove 56, thereby removably locking the shells to one another (FIG. 5). In another locking embodiment, the groove and indent are removed, as ledges 54 and 58 provide a snug fit when inner ledge 58 is inserted into the inner area defined by shell 30. Other attachment methods possible and are within the scope of the present invention. In either of the above described attaching embodiments, glue or other sticky substances can be provided on either or both ledges, to prevent inadvertent detachments of the shells 30 and 40 from each other.

Springs 16 and 18, are housed within spring housings 20 and 22. Each spring housing consists of plate 70 and 72, respectively and respective housing walls 74 and 76. Walls 74 and 76 have ledges 78 and 80, respectively, depending therefrom. In one embodiment, cover plates 70 and 72 also have ledges 82 and 84, respectively, and the attachment of plate 70 or 72 to wall 74 or 76, respectively, is similar to the attachment methods described above for shells 30 and 40. Accordingly, a groove 86 and indent 88 can be provided on ledges 82 and 84, respectively, or the ledges themselves can provide a snug fit.

It is to be understood that the location of the groove and indent can be opposite for either the attaching of the cover plate to the housing wall or the outer shells to each other. For example, groove 86 can be disposed on ledge 84, while indent 88 is provided on ledge 82.

In another embodiment of spring housings 20 and 22, ledge 78 or 80 of wall 74 or 76, respectively, can have an overhang portion (not shown) creating an inner shoulder area. In this embodiment, cover plates 70 and 72 do not have any ledges depending therefrom and are of a diameter which is slightly smaller than the inner diameter of the overhang portion but slightly larger than the inner diameter of the inner shoulder. Thus, cover plates 70 and 72 are attached to walls 74 and 76, respectively, by inserting plates 70 and 72 within the respective area defined by ledges 78 and 80. Plates 70 and 72 are inserted until resting or abutting the shoulder areas and are snugly fitted within this area. Glue or other sticky substances may also be provided as with shells 30 and 40.

The outer surfaces of walls 74 and 76, have protrusions 94 and 96, respectively, depending outward therefrom. Pin receiving cavities 98 and 100, are defined by walls 74 and 76 and protrusions 94 and 96, respectively. The outer surfaces of plates 70 and 72, have spacers 102 and 104, respectively, depending outward therefrom. The diameter of spacers 102 and 104 are slightly smaller than those of spacer receiving cavities 38 and 48, respectively, for insertion of spacers 102 and 104 therein when the device is assembled. Apertures 106 and 108 extend through spacers 102 and 104 and plates 70 and 72, respectively. When spacers 102 and 104 are inserted within cavities 38 and 48, respectively, apertures 106 and 108 are aligned and communicating with the respective apertures 50 and 52 extending through shells 30 and 40.

Housings 20 and 22 are provided with means for attaching one end of the springs disposed within said housings. In one embodiment of the attachment means at least one slot 110, preferably two, are provided in ledges 78 and 80 defining a resting portion 112 therebetween. In this attachment embodiment, one end of springs 16 or 18 is inserted through the first slot 110 over portion 112 and back within the housing area by insertion through second slot 110. Other spring attachment means are possible and are within the scope of the present invention.

Pins 120 and 122 are provided for attachment to the opposite ends of springs 16 and 18, respectively. Pins 120 and 122 are provided with a body member 124 having a stub portion 126 depending outward therefrom. As seen in FIG. 2, pins 120 and 122 are provided with slots 130 which communicate with tip receiving cavities 128, discussed further below. To attach, the end of the coil spring is inserted through tip receiving cavities 128 and into slots 131 and bent at least partially around body member 124.

When assembling or disposing springs 16 and 18, within housings 20 and 22, respectively, one end of spring is attached to pins 120 and 122 and the other end of the spring is attached to its respective housing. The coil spring is wrapped around and contained by the inner border of ledge 78 or 80. Once coil spring 16 or 18 has been at least partially wrapped around body member 124, stub portion 126 of pins 120 and 122 are inserted within cavities 98 and 100. Once the pin has been inserted, cover plates 70 and 72 are attached to walls 74 and 76, as described above, to contain respective coil springs 16 and 18 in its semi-compressed state within housings 20 and 22.

Preferably, pins 120 and 122 extend through apertures 106 and 108 when cover plate 70 and 72 are attached to respective walls 74 and 76 for the insertion of the tip portions 132 of caps 130 within the tip receiving opening 128 of pins 120 and 122. However, by proving a longer tip portion for cap 130, pins 120 and 122 can be fully disposed within respective housings 20 and 22.

A divider 29 is provided having shoulder portions 31 and 33, depending outwardly from its first and second surfaces, respectively. A passageway 35 can extend through shoulder portions 31 and 33 and divider 29 or each shoulder portion can define cavities (not shown) therein for receiving protrusions 94 and 96 of walls 74 and 76, respectively. A hole 37 is provided through divider 29 for the insertion of telephone cord 12 therethrough. Housings 20 and 22 are attached to divider 29 by inserting protrusions 94 and 96 through passageway 35. Once inserted, walls 74 and 76, shoulders 31 and 33 and divider 29 define respective cord or cable reels 140 and 142 which are each bounded by one surface of divider 29 and the outer surface of their respective housing 20 or 22. Reels 140 and 142 are slightly larger in width than the width of cord 12, to allow cord 12 to fit within the space defined between divider 29 and housing 20 or 22. Thus, cord 12 will freely rotate within casing 14 when either end of cord 12 is pulled while at the same time not allowing cord 12 to have lateral movement which could cause cord 12 to become twisted or tangled. For ease of assembly cord or cable 12 should be inserted through hole 37 of divider 29 before housings 20 and 22 are attached.

Preferably, half of cord 12 is inserted through hole 37 to provide equal lengths of cord 12 on either side of divider 29. Once cord 12 has been inserted through hole 37 modular jacks 13 and 15 are then attached to each end of cord 12 by conventional means. Once reels 140 and 142 have been defined by the attachment of housings 20 and 22 to divider 29, each half of cord 12 is wrapped around its respective reel.

A single slot 150, slightly larger than the circumference of cord 12 is provided at a predetermined area of ledge 54 of shell 30. Ledge 58 of shell 40 is also provided with a similar slot 150 at a predetermined area of ledge 58. An additional slot 152 which extends through ledge 58 and a portion of the body area of shell 30 opposite slot 152 is also provided. Once cord 12 has been wrapped around reels 140 and 142, shells 30 and 40 are inserted over the partially assembled device and attached such that slots 150 are aligned and a portion of ledge 54 covers the portion of slot 152 disposed through ledge 58. Thus, once shells 30 and 40 are properly attached to each other, two similar sized openings are provided at opposite ends of casing 14. Before attachment of shells 30 and 40 one end of cord 12 is disposed within slot 150 and the other end is disposed within slot 152. Thus, the ends of cord 12 will be extending through and out of the openings of casing 14 when shells 30 and 40 are attached to each other.

Modular jacks 13 and 15 are attached to each end of cord 12 to prevent the ends of cord 12 from slipping within casing 14. Once shells 30 and 40 have been attached, caps 130 are inserted through apertures 50 and 52 of shells 30 and 40 such that tip portions 132 of caps 130 are received within openings 128 of pins 120 and 122. Caps 130 combine to hold pins, and their attached spring, in position.

Thus to assemble device 10, cord 12 is inserted, preferably half way, through hole 37 of divider 29 and jacks 13 and 15 are attached to each end of cord 12. One end of each of coil spring 16 and 18 is attached to its respective housing, while the other end is attached to pins 120 and 122 by insertion of such end in slot 131. Once the spring end is attached, pins 120 and 122 are inserted within pin receiving cavities 98 and 100 and cover plates 70 and 72 are attached to respective walls 74 and 76, preferably causing tip receiving portion 128 of pins 120 and 122 to extend through respective plate apertures 106 and 108 and outward from plates 70 and 72, respectively. Housings 20 and 22 are attached to opposite sides of divider 29 to define reels 140 and 142 on each side of divider 29. Each half of cord 12 is wrapped around its associated reel in opposite directions from each other (i.e one half clockwise, the other half counter-clockwise). Shells 30 and 40 are attached to each other, with the partially assembled device disposed within, such that slots or openings are formed at opposite ends of casing 14. The attachment of the shells to each other retains cord 12 in its wrapped position around reels 140 and 142. Each end of cord 12, having its associated jack 13 or 15 attached thereto, extend out of casing 14 through its associated casing opening and ready for attachment to a telephone outlet, telephone base, telephone handpiece, etc.

In use, the pulling on either end of cord 12 causes divider 29 and housings 20 and 22 to rotate within casing 14, thus squeezing and tightly winding springs 16 and 18 disposed within housings 20 and 22, respectively. Thus, the pulling of either end of cord 12 causes the compression or loading of springs 16 and 18. When such pull or hold on cord 12 is released, the loaded springs unwind, losing their compression, causing the retraction of the exposed cord back within casing 14 and neatly wound around reel 140 or 142 along with the unexposed portion of cord 12.

FIGS. 9 through 12 illustrate a second embodiment of the present invention. This embodiment can be used for the same purposes as the first embodiment of the present invention. As seen in this embodiment, the present invention is shown generally at 200 and includes first and second outer shells 210 and 230, respectively, spring 202 and an intermediate spool member 250 having side walls 252 and a middle wall divider 253 which define two cord reel 254 and 256.

Shell 210 can be attached to shell 230 in various ways similar to those described above for the first embodiment such as the indent and groove combination. A pair of slots 204 are disposed on opposite sides of shells 210 and 230 such that when shells 210 and 230 are attached to each other, cord openings 206 are defined at opposite ends of casing or housing 200. Shell 230 has a pin member 232 protruding outward from its inner surface. Shell 210 can have a pin receiving cavity 212 for receiving the tip portion of pin 210 when the shells are attached to each other. However, the length of pin 232 can be shortened in order to dispose of the need of cavity 212.

Spool member 250 has a spring receiving bore or cavity 260 disposed within a first side surface of member 250 and a pin receiving passageway 262, corresponding in shape to pin member 232, disposed within an opposite side surface of member 250. Passageway 262 communicates with bore 260 and is preferably aligned with the center of bore 260. A hole 264 is disposed through a portion of middle wall 253 of member 250 to allow for the insertion of telephone cord 12 therethrough.

A slot 234 is disposed on the portion of pin member 232 which is disposed within bore 260, when pin 232 is inserted through passageway 262 and bore 260 of spool member 250, for attachment of a first end of spring 202. A slot can be disposed within the wall 266 defining bore 260 for attachment of the other end of spring 202 or the resting of such end against wall 266 itself can retain spring 202 in proper position.

Reels 254 and 256 are slightly larger in width than the width of cord 12, to allow cord 12 to fit within the space defined by walls 252 and 253. Thus, cord 12 will freely rotate within the casing when either end of the cord 12 is pulled while at the same time not allowing cord 12 to have lateral movement which could cause cord 12 to become twisted or tangled.

Cord 12 and jacks 13 and 15 can be the same for all of the embodiments of the present invention. However, it is to be understood that the present invention is not limited to any length or type of cord, as well as any attaching jack.

Preferably, half of cord 12 is inserted through hole 264 to provide equal lengths of cord on either side of middle wall 253. Once cord 12 has been inserted through hole 264 modular jacks 13 and 15 are then attached to each end of cord 12. Each half of cord 12 is then wrapped around its respective reel 254 and 256.

In the assembly of the second embodiment, cord 12 is inserted, preferably half way, through hole 264 in middle wall 253 and jacks 13 and 15 are disposed on either end of cord 12. Each half of cord 12 is wrapped around its respective reel 254 and 256 in opposite directions from each other (i.e one half clockwise, the other half counter-clockwise) and coil spring 202 is inserted within bore 260. Pin 232 is inserted through passageway 262 and bore 260, The ends of spring 202 are attached as described above. By attaching shell 210 to shell 230, the tip portion of pin 232 is received within cavity 212 of shell 210. As mentioned above, slightly shortening the length of pin 232, eliminates the need for cavity 212. Before shells 210 and 230 are finally attached to each other, the ends of cord 12 are extending outward from casing 200 through openings 206.

In use, the pulling on either end of cord 12 causes spool member 250 to rotate within casing 200, thus squeezing or winding spring 202 disposed within bore 260. Thus, the pulling of either end of cord 12 causes the compression or loading of spring 12. When such pull or hold on cord 12 is released, the loaded spring unwinds, losing its compression, causing the retraction of the exposed cord back within casing 200 and neatly wound around reel 254 or 256 along with the unexposed portion of cord 12.

Preferably, in either the first or second embodiment, half of the length of the cord 12 is available from either end of the casing by pulling on the end of the cord associated with such end of the casing. However, it is to be understood such division of the cord in halves is not limiting only preferred for these embodiments. Thus, the amount of cord 12 that will be available at each end depends on how much of the cord is initially inserted or fed through the hole 37 in divider 30 (first embodiment) or the hole 264 in middle wall 253 (second embodiment). FIGS. 21 through 24 illustrate some of the various uses of either embodiment, as well as the fourth embodiment which will be described in detail below.

Figures 11, 13:
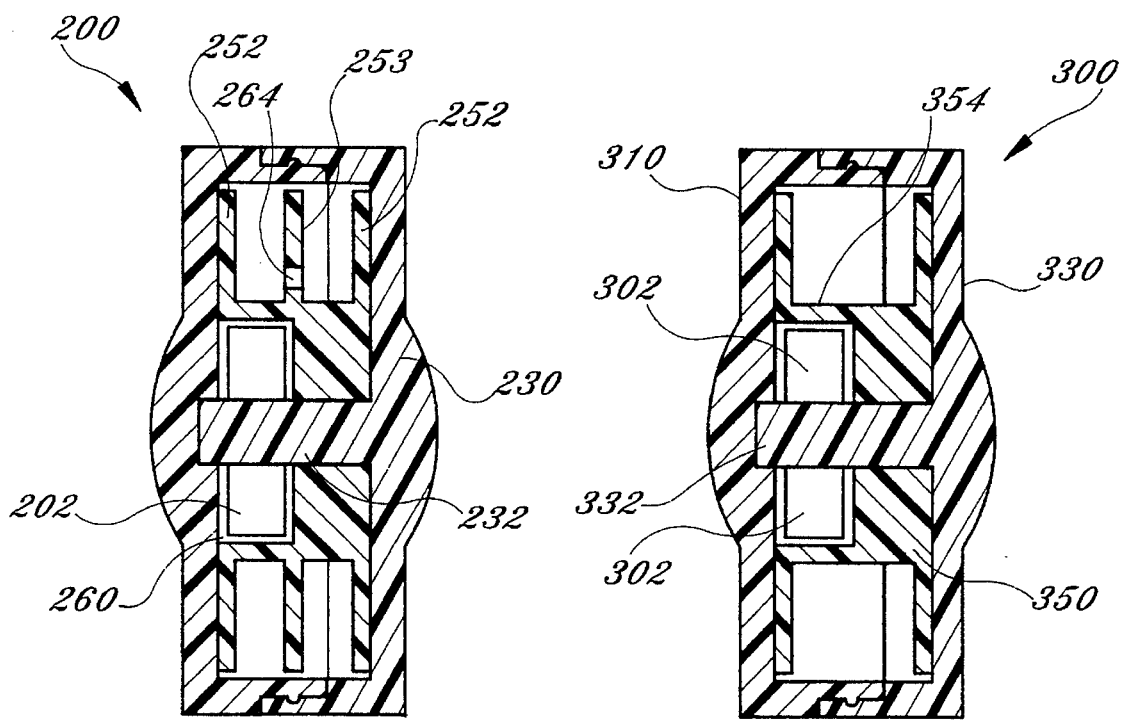
FIG. 11 is an assembled side sectional view of the present invention shown in FIG. 9.
FIG. 13 is an assembled side sectional view of the third embodiment of the present invention.
Figure 12:
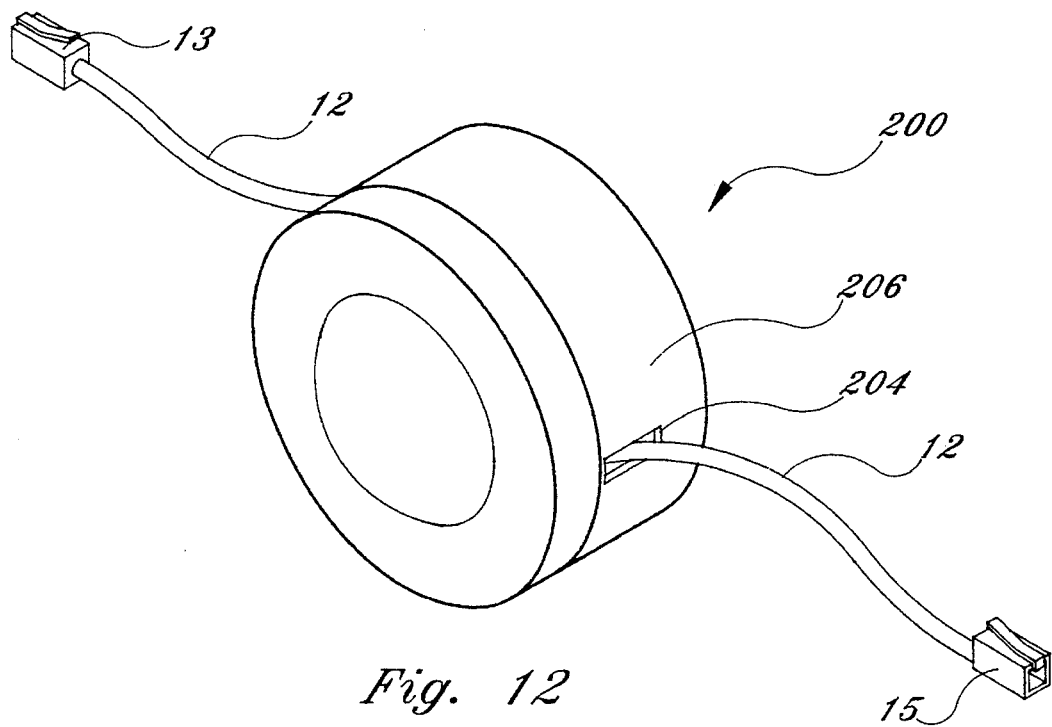
FIG. 12 is a perspective view of the second embodiment of the present invention.
Figure 14:
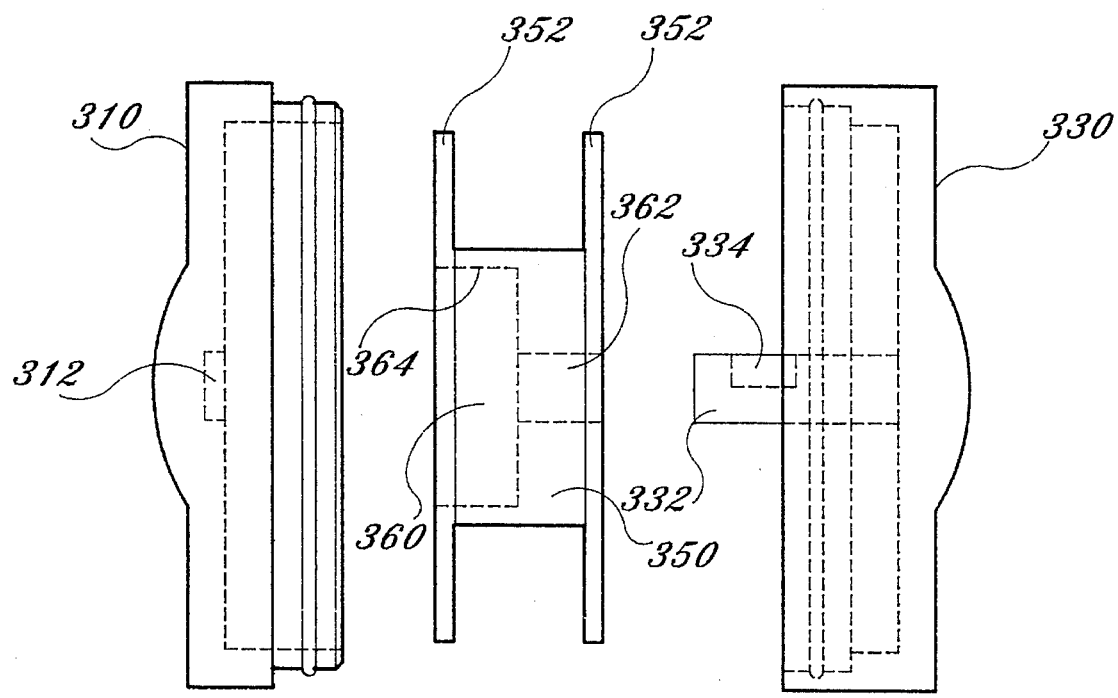
FIG. 14 is a side exploded view of the third embodiment of the present invention.
Figure 15:
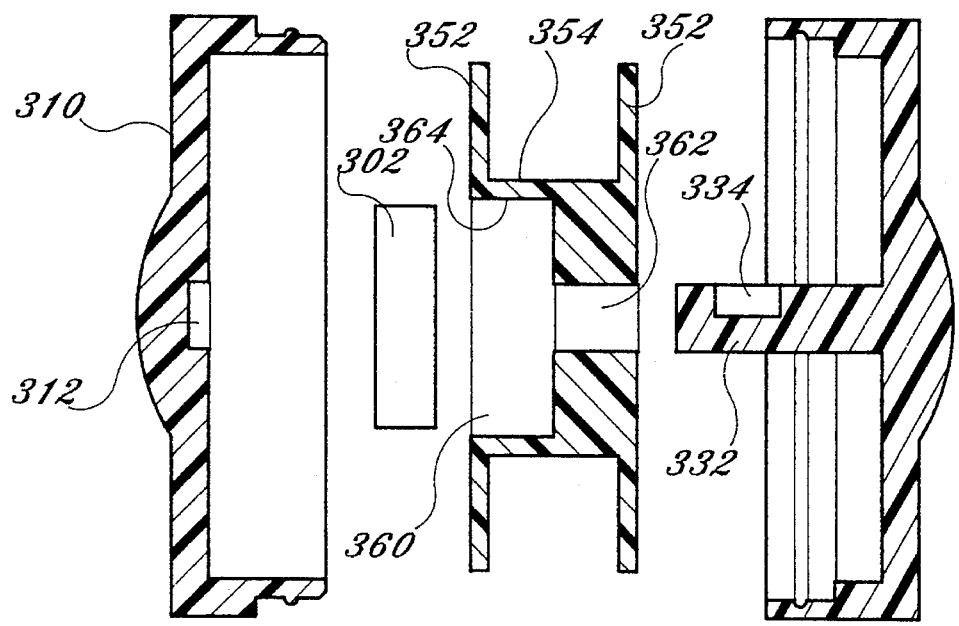
FIG. 15 is an exploded sectional view of the present invention shown in FIG. 14.
Figure 16:
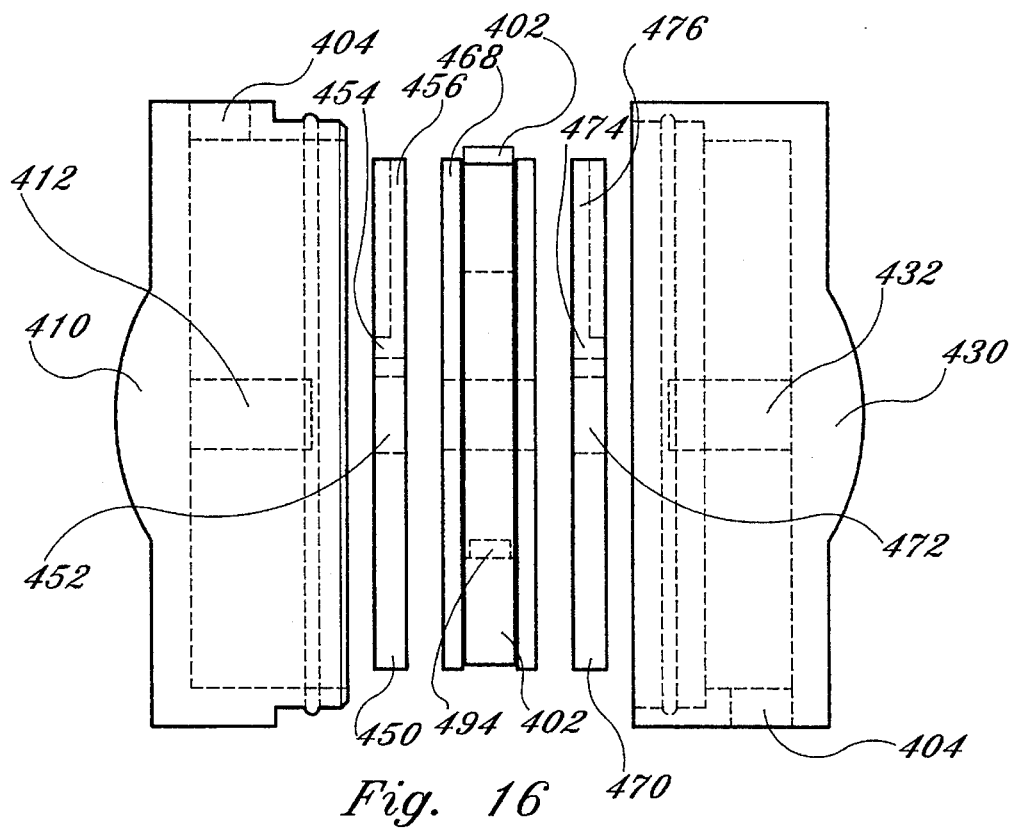
FIG. 16 is a side exploded view of the fourth embodiment of the present invention.
Figure 17:
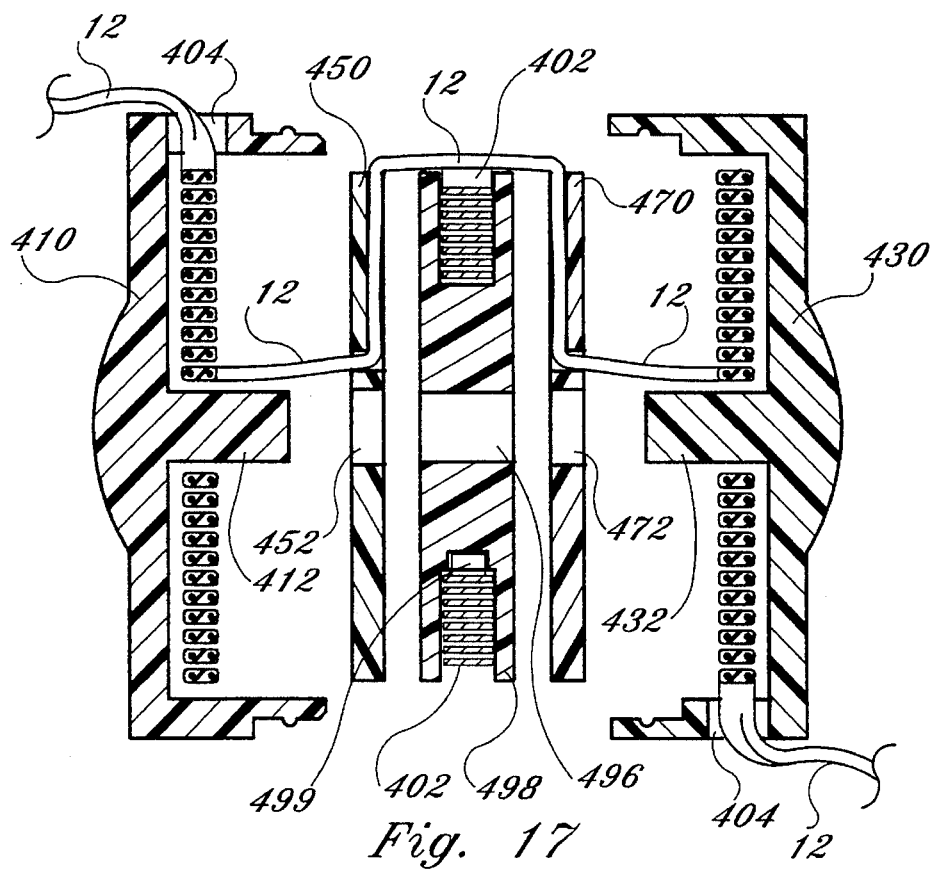
FIG. 17 is an exploded sectional view of the present invention shown in FIG. 16.
Figure 18:
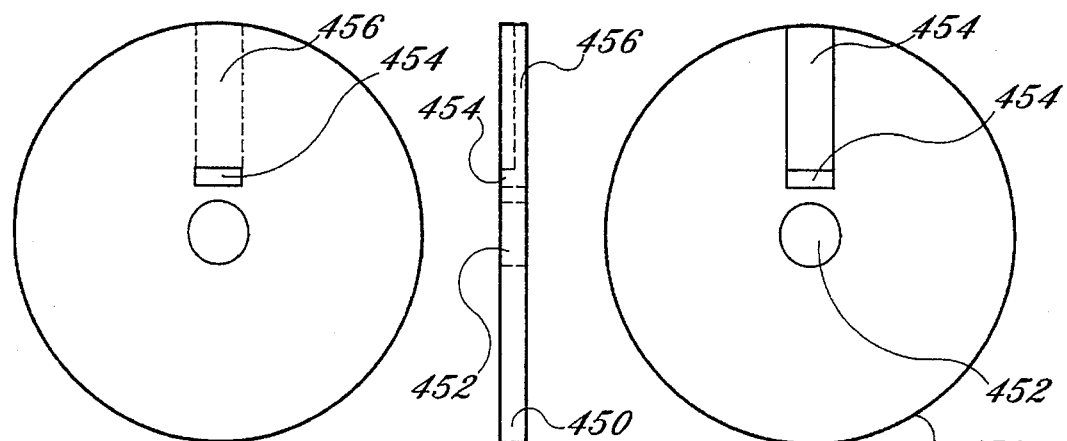
FIG. 18 are various elevational views of the disk member of the fourth embodiment of the present invention.
Figure 19:
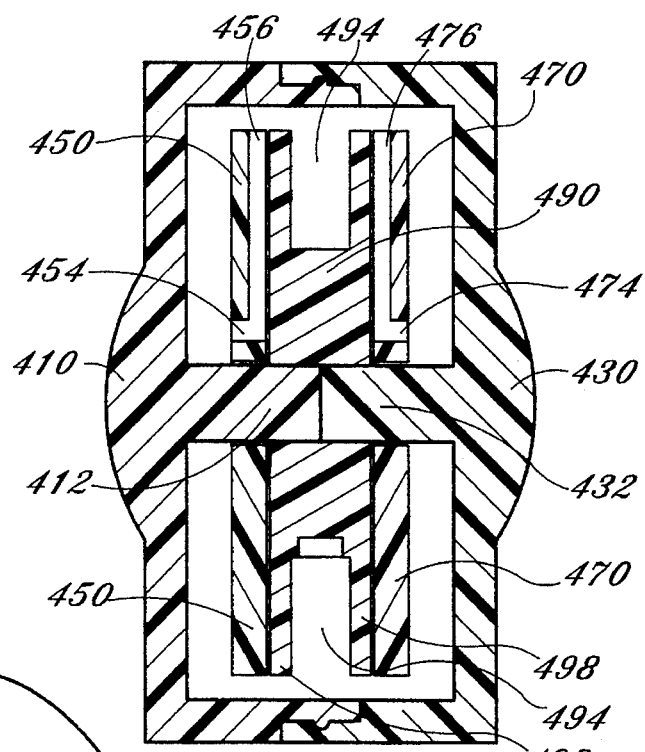
FIG. 19 is an assembled side sectional view of the fourth embodiment of the present invention.
Figure 20:
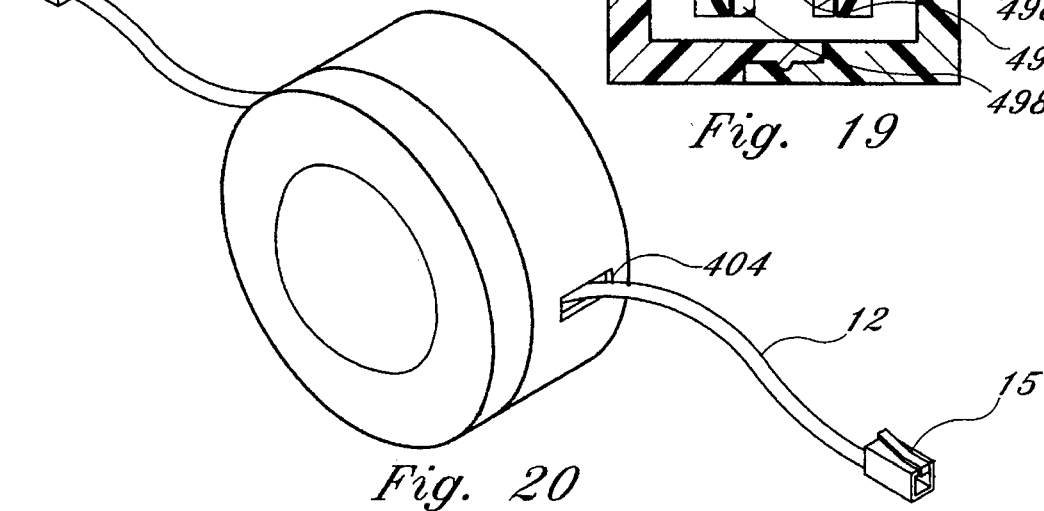
FIG. 20 is a perspective view of the fourth embodiment of the present invention.

FIGS. 13 through 15 illustrate a third embodiment of the present invention. This embodiment is structurally similar to the second embodiment except for a portion of its respective spool member. Thus, the third embodiment, when assembled, will appear similar from the outside as the second embodiment shown in FIG. 12. However, as will be discussed below, the third embodiment functions different from the second embodiment.

As seen in this embodiment, the present invention is shown generally at 300 and includes first and second outer shells 310 and 330, respectively, spring 302 and an intermediate spool member 350 having walls 352 which define a cord reel 354.

Shell 310 can be attached to shell 330 in various ways similar to those described above for the first embodiment such as the indent and groove combination. A pair of slots (not shown but similar to slots 204 of the second embodiment) are disposed on opposite sides of shells 310 and 330 such that when shells 310 and 330 are attached to each other, cord openings 306 are defined by casing or housing 300. Shell 330 has a pin member 332 protruding outward from its inner surface. Shell 310 can have a pin receiving cavity 312 for receiving the tip portion of pin 332 when the shells are attached to each other. However, the length of pin 332 can be shortened in order to dispose of the need of cavity 312.

Spool member 350 has a spring receiving bore or cavity 360 which can disposed within a first side surface a majority of the width of member 350 and a pin receiving passageway 362 disposed within an opposite side surface of member 350. Passageway 362 communicates with bore 360 and is preferably aligned with the center of bore 360.

A slot 334 is disposed on the portion of pin 332 which is disposed within bore 360 when pin 332 is inserted through passageway 362 and bore 360 of spool member 350 for attachment of a first end of spring 302. A slot can be disposed within the wall 364 defining bore 360 for attachment of the other end of spring 302 or the resting of such end against wall 364 itself can retain spring 302 in proper position.

Reel 354 is slightly larger in width than the width of cord 12, to allow cord to fit within the space defined by walls 352. Thus, cord 12 will freely rotate within casing when either end of the cord 12 is pulled while at the same time not allowing cord 12 to have lateral movement which could cause cord 12 to become twisted or tangled.

In the assembly of the third embodiment, jacks 13 and 15 are disposed on either end of cord 12. Cord 12 is wrapped around reel 354 (in either clockwise or counterclockwise direction) and coil spring 302 is inserted within bore 360. Pin 332 is inserted through passageway 362 and bore 360. The ends of spring 302 are attached as described above. By attaching shell 310 to shell 330, the tip portion of pin 332 is received within cavity 312 of shell 310. As mentioned above, slightly shortening the length of pin 332, eliminates the need for cavity 312. Before shells 310 and 330 are finally attached to each other, the ends of cord 12 are extending outward from casing 300.

Figure 25:
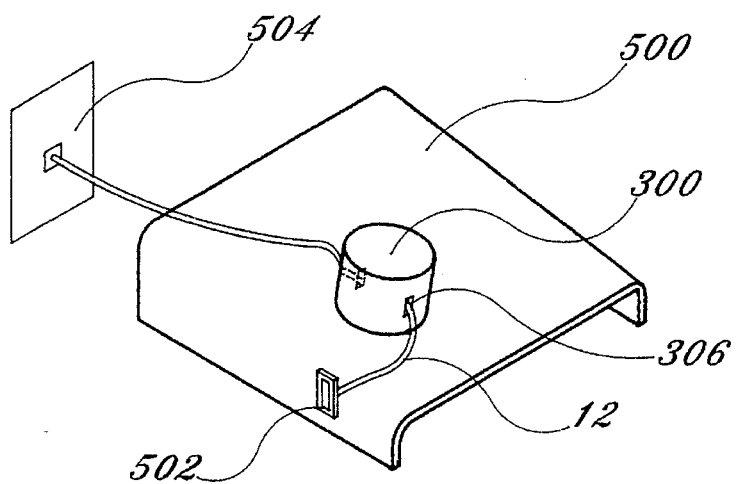
FIGS. 25 and 26 are top view illustrating one use of the third embodiment of the present invention.
Figure 26:
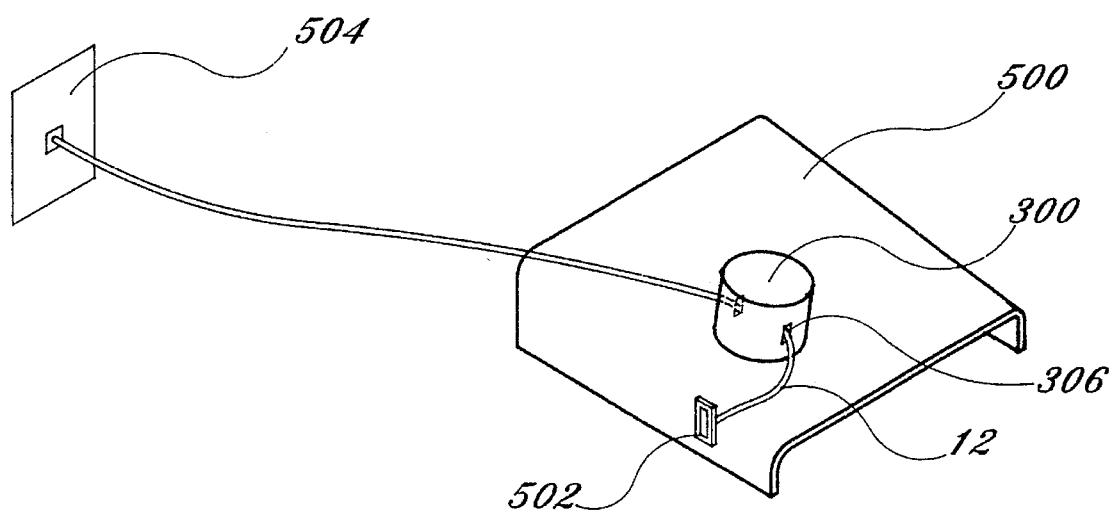

This embodiment of the present invention allows for nearly the entire length of cord 12 to be pulled or extended out of either end of casing 300. As seen in FIGS. 25 and 26, casing 300 can be preferably attached underneath or to the base of telephone 500 or attached to or near a wall where the phone outlet is disposed. In these situations, it is desirable for one end of cord 12 to extend out from one end only a few inches, thus, maximum cord length can be available for the device attached to the opposite end of cord 12. Although, the first and second embodiments of the present invention can also be used for such situations, only half of the cord length is available at the other end, thus unnecessarily restricting the distance the device which is attached to such end can be moved.

In use, one end of cord 12 is attached to a device (i.e. phone outlet, phone base, etc.) and extended out a predetermined distance. The pulling on the opposite end of cord 12 causes spool member 350 to rotate within casing 300, thus squeezing or winding spring 302 disposed within bore 360. Thus, the pulling of end of cord 12 causes the compression or loading of spring 302. When such pull on cord 12 is released, the loaded spring unwinds, losing its compression, causing the retraction of the exposed cord back within casing 300 and neatly wound around reel 350, along with the unexposed portion of cord 12, except for the small portion of the opposite end of cord 12 which remains extended out of casing 300 and exposed.

FIGS. 16 through 20 illustrate a fourth embodiment of the present invention. This embodiment can be used in the same situations as the first and second embodiments of the present invention. As seen in this embodiment, the present invention is shown generally at 400 and includes first and second outer shells 410 and 430, respectively, spring 402, first disk 450, second disk 470 and a spool member or spring reel 490 having walls 498 which define a spring area 494.

Shell 410 can be attached to shell 430 in various ways similar to those described above for the first embodiment such as the indent and groove combination. A cord opening 404 is disposed at one end of shells 410 and shell 430. Such that when shells 410 and 430 are attached to each other, cord openings 404 are disposed at opposite ends of casing or housing 400. Each shell has a pin member 412 and 432, respectively, protruding outward from its inner surface.

Disks 450 and 470, each have a pin receiving opening 452 and 472, extending therethrough, as well as a respective cord receiving cavity 454 and 474 disposed on one side of disks 450 and 470 which is in communication with a cutout 456 and 476, respectively, disposed on the opposite side of disks 450 and 470. Spring reel 490 has a passageway 496 extending therethrough for receiving the tip portions of pins 412 and 432. Alternatively, pin receiving cavities (not shown) could be disposed on both sides of reel 490 for receiving said tip portions. Spring area 494 of reel 490 is defined by walls 498 and the middle portion of reel 490. The middle portion can have a slot 499 for attachment of one end of spring 402. Spring area 494 is slightly larger in width than the width of spring 402 to allow for easy placement of spring 402 within spring area 494, while at the same time preventing lateral movement of spring 402.

In assembly, spring 402 is disposed in spring area 494 of reel 490 and one end of spring 402 is inserted within slot 499. One end of cord 12 is inserted through cavity 454 or 474 and up along the vertical length of respective cutout 456 or 476, around and over spring 402, which is disposed in its designated area 494, and down along the vertical length of the cutout of the opposite disk, and through and out of the opposite disk's cavity. Preferably, cord 12 is fed through, as described above, until equal lengths of cord 12 are available at each side. Jacks 13 and 15 are attached to each end of cord 12. Each half of cord 12 is wrapped around its associated pin member 412 and 432, except for jack 13 and 15 and small end portions of cord 12, which extend out of openings 404 disposed in shells 410 and 430. The portion of cord 12 which is disposed over spring 402 acts to retain spring 402 in position within the defined spring area 494 of reel 490 when shells 410 and 430 are attached to each other.

Pin members 412 and 432 are inserted through the passageway 452 and 472 of its associated disks 450 and 472 and into passageway 496, or cavities of spring reel 490. This insertion pushes the cord along pin members 412 and 432 until cord 12 abuts the inner wall of shells 410 and 430 to assure cord 12 is wrapped only around the portion (preferably half the length of pin members 412 and 432) of pin member 412 and 432 which is closest to shells 410 and 430, in order to align cord 12 with openings 404. Pin members 412 and 432 are inserted into the passageway until shells 410 and 430 are attached to each other in one of the manners described above.

When assembled the portions of cord 12 which are disposed along the length of cutouts 456 and 476 are held in position by the side surfaces of disks 450 and 470 in conjunction with the side surface of reel 490. In this embodiment when either end of cord 12 is pulled, the associated shell 410 or 430 rotates with such pulling. This differs from the previous three embodiments wherein the pulling of the cord does not cause the outer shells to rotate.

As previously mentioned, the pulling on either end of cord 12 causes the associated shell 410 or 430 to rotate, thus causing reel 490 also to rotate, which in turn squeezes or tightly winds spring 402 disposed in spring area 494 of reel 490. Thus, the pulling of either end of cord 12 causes the compression or loading of spring 402. When such pull on cord 12 is released, the loaded spring unwinds, losing its compression, causing the retraction of the exposed cord back within casing 400 and neatly wound around pin members 412 and 432, along with the unexposed portion of cord 12.

FIGS. 21 through 26 show various uses of the present invention. These figures illustrate that when the device is not in use, minimal amount of cord is required to be extending out of the device, thus overcoming the problems of the prior art, where the spiral cords become all twisted and tangled. Furthermore, when in use, the device provides for the withdrawal of a substantial amount of cord to be withdrawn, preferably more length than is provided by the spiraled cords. The device is not limited to any fix length of cord, and any length of cord can be utilized with the present invention.

Figure 21:
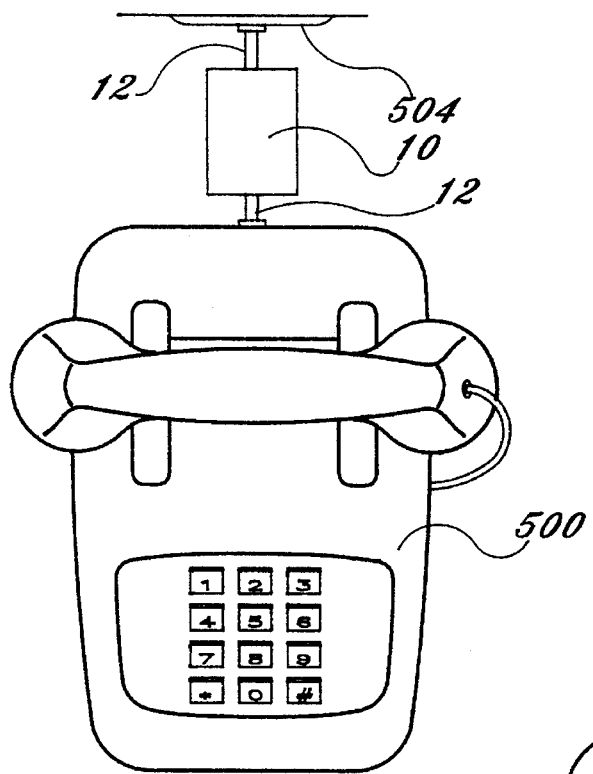
FIGS. 21 and 22 are a top view illustrating one use of either the first, second or fourth embodiment of the present invention.
Figure 22:
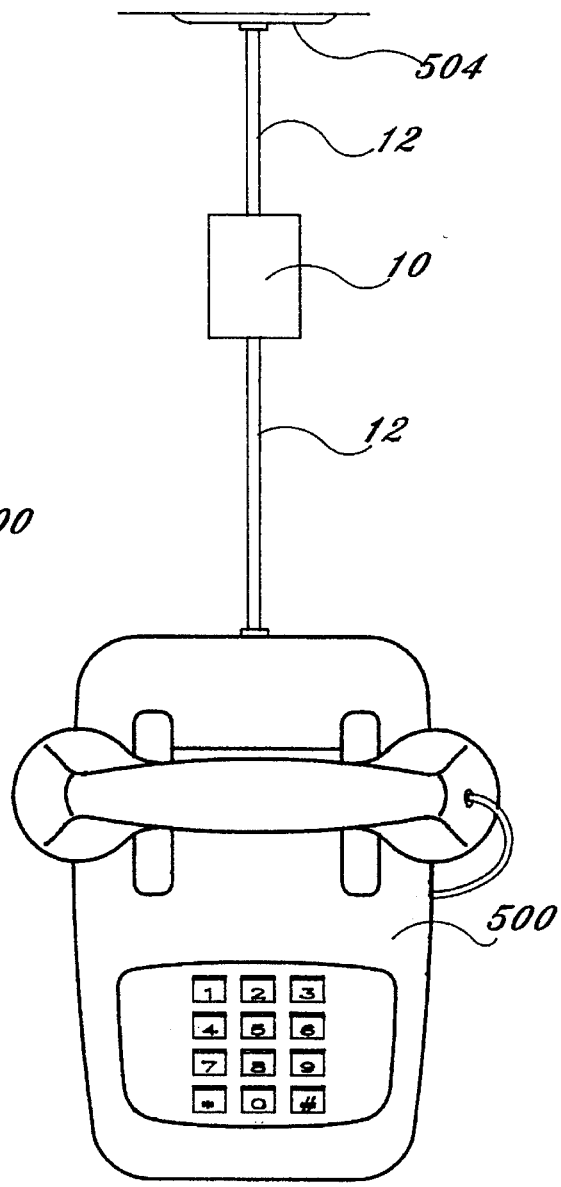

In FIGS. 21 and 22, cord 12 is attached at one end to wall outlet 504 and at the other end to the phone outlet of phone 500. FIG. 22 illustrates the phone being pulled away from the wall outlet, thus additional cord is withdrawn from device 10. FIG. 21 illustrates the position of phone 500 when the pull is released. Preferably, either the first, second or fourth embodiments will be utilized for this purpose. The third embodiment may also be utilized but is not preferred.

Figure 23:
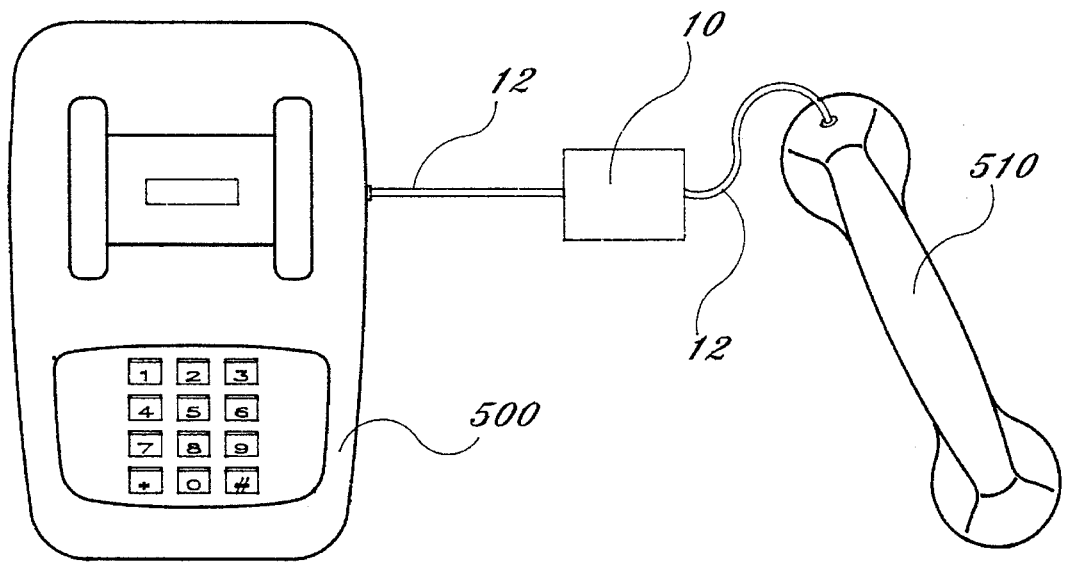
FIGS. 23 and 24 are a top view illustrating an alternative use of either the first, second or fourth embodiment of the present invention.
Figure 24:
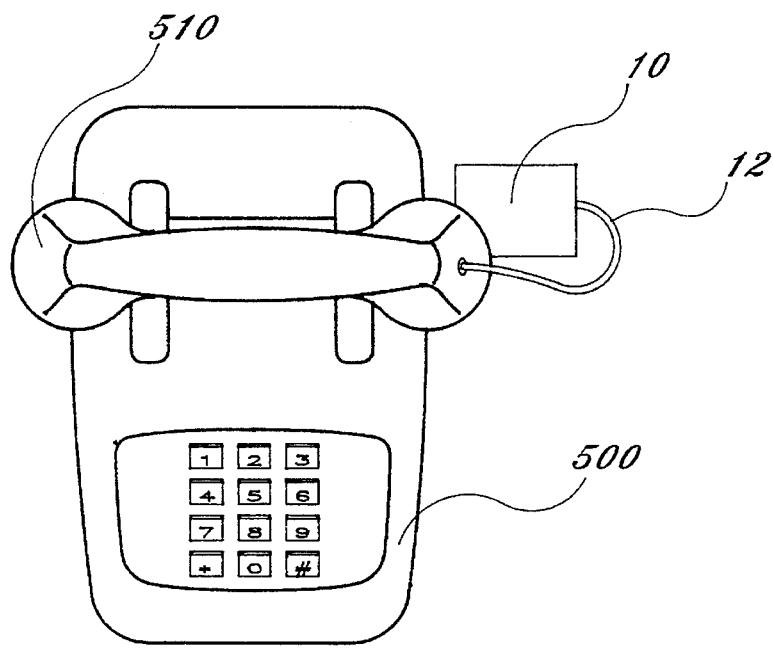

In FIGS. 23 and 24, cord 12 is attached at one end to the outlet of handpiece 510 and at the other end to the phone outlet of phone 500. FIG. 23 illustrates the phone or the handpiece being pulled way from each other, thus additional cord is withdrawn from device 10. FIG. 24 illustrates the position of device 10 when handpiece 510 is returned to phone 500. Preferably, either the first, second or fourth embodiments will be utilized for this purpose. The third embodiment may also be utilized but is not preferred.

FIGS. 25 and 26 illustrate the primary use of the third embodiment of the present invention, though the remaining embodiments may also be utilized. The face of phone 500 is removed for illustrative purposes only. Device 300 is attached to the bottom of side of phone 500. Cord 12 is attached at one end to wall outlet 504 and at the other end to the phone outlet of phone 500. Since only a short distance is required from device 300 to the phone outlet, the structure of the spool member (shown in previous drawings) of device 300 allows for most of cord 12 to be available from device 300 at the end opposite opening 306. FIG. 26 illustrates the phone being pulled away from wall outlet 504, thus additional cord is withdrawn from device 10. FIG. 25 illustrates the position of phone 500 when the pull is released. It is also to be understood that cord 12 of device can also be attached to the handpiece at one end and to the phone outlet at the other, similar to FIGS. 23 and 24.

The openings or slots which allow the cord to extend out of the casing in the second and third embodiments of the present invention can be configured as those described for openings in the first embodiment of the present invention.

Glue can be provided to the various pins, shells, housing and caps to help maintain assembly.

Though the present invention is described and shown in use in conjunction with a telephone handpiece and base, it is to be understood that the present invention is not limited to such. The teachings of the present invention can be utilized with numerous types of electrical devices including, hand held shavers, vacuum cleaners, electronic equipment, appliances, computer equipment, etc, as well numerous types of non-electrical devices including tubing, etc.

The present invention isn't limited to any specific material in constructing the various parts for each of the embodiments. Preferably, the various parts are made of plastic (except the cord, jacks and spring). However, this is not limiting and other materials such as wood, metal, etc. may be substituted and are within the scope of the present invention.

The instant invention has been shown and described herein in what is considered to be the most practical and preferred embodiment. It is recognized, however, that departures may be made therefrom within the scope of the invention and that obvious modifications will occur to a person skilled in the art. Furthermore, it must be clearly understood that the specification is made only as an example and is not to be considered as a limitation on its scope. It is also recognized that others can, by applying current knowledge readily adapt it for various applications without omitting features that, from the standpoint of prior art, fairly constitute essential characteristic of the generic or specific aspect of the present invention. Therefore, such adaptations should and are intended to be comprehended within the meaning and range of equivalence of the following claims.

What is claimed is:

1. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening, said housing having a first shell member and a second shell member;

means for allowing a portion of said cord to be withdrawn out of one of said cord openings, the portion of said cord disposed within said housing before being withdrawn, said means for allowing disposed within said housing; and means for automatically returning the portion of said cord withdrawn back into said housing, said means for automatically returning disposed within said housing, said means for automatically returning comprising:

a first spring housing and a second spring housing, each spring housing having a body member and a plate member attached to each other to define a spring receiving area, a divider member having a cord receiving aperture extending therethrough, said first spring housing attached to one side of said divider member to define a first reel and said second spring housing attached to an opposite side of said divider member to define a second reel, said cord being inserted through said cord receiving aperture to allow a first portion of said cord to be disposed around said first reel and a second portion of said cord to be disposed around said second reel;

a first spring disposed within said first spring housing, at least one end of said first spring attached to said first spring housing, wherein a first end of said first spring is attached to a first pin member disposed within said first spring housing; and a second spring disposed within said second spring housing, at least one end of said second spring attached to said second spring housing, wherein a first end of said second spring is attached to a second pin member disposed within said second spring housing;

wherein said first shell member, said second shell member and said plate members having apertures extending therethrough, said pin members each having cap receiving cavities, said device further including a first cap member and a second cap member, said cap members each having tip portions, wherein the tip portion of said first cap member being inserted through the aperture of said first shell member and the plate member of said first spring housing for mating with the cap receiving cavity of said first pin member, wherein the tip portion of said second cap member being inserted through the aperture of said second shell member and the plate member of said second spring housing for mating with the cap receiving cavity of said second pin member.

2. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening; said housing having a first shell member and a second shell member;

means for allowing a portion of said cord to be withdrawn out of one of said cord openings, the portion of said cord disposed within said housing before being withdrawn, said means for allowing disposed within said housing, said means for allowing being a first pin member depending from an inside surface of said first shell member and a second pin member depending from an inside surface of said second shell member, a first portion of said cord being wrapped around said first pin member and a second portion of said cord being wrapped around said second pin member, said first pin member having a uniform diameter and said second pin member having a uniform diameter, the diameter of said second pin member being equal to the diameter of said first pin member; and means for automatically returning the portion of said cord withdrawn back into said housing, said means for automatically returning disposed within said housing.

3. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening, wherein said housing having a first shell member and a second shell member;

means for allowing a portion of said cord to be withdrawn out of one of said cord openings, the portion of said cord disposed within said housing before being withdrawn, said means for allowing disposed within said housing; and means for automatically returning the portion of said cord withdrawn back into said housing, said means for automatically returning disposed within said housing, said means for automatically returning comprising:

a first pin member depending from an inside surface of said first shell member and a second pin member depending from an inside surface of said second shell member, a first portion of said cord being wrapped around said first pin member and a second portion of said cord being wrapped around said second pin member;

a first disk member and a second disk member, said disk members each having a pin passageway and a cord passageway extending therethrough, a portion of said pin members disposed within its respective disk's pin passageway when said first shell member is attached to said second shell member;

a spool member having a first side surface and a second side surface, a middle portion of said spool member in conjunction with said first side surface and said second side surface defining a spring reel, said middle portion having a passageway extending therethrough for receiving a portion of each pin member when said first shell member is attached to said second shell member, and a spring disposed around said spring reel and attached at one end to said spring reel, a portion of said cord being disposed over said spring when said spring is disposed around said spring reel and said first shell member is attached to said second shell member.

4. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening, said housing having a first shell member and a second shell member, said first shell member having a pin member depending from an inside surface of said first shell member;

a spool member having a first side surface and a second side surface, said spool member disposed within said housing, a middle portion of said spool member in conjunction with said first side surface and said second side surface defining at least one cord reel, said cord being wrapped around said cord reel, a first end of said middle portion having a spring receiving cavity disposed therein and an opposite end of said middle portion having a passageway being disposed therein, said cavity communicating with said passageway, said pin member disposed within said cavity and said passageway when said first shell member is attached to said second shell member; and a spring disposed within said cavity, said spring having a first end removably attached to said pin member.

5. The extensible and self-retractable device of claim 4, wherein said spool member having a divider depending outward from said middle portion between the first side surface and the second side surface to define two cord reels, said divider having an aperture extending therethrough for insertion of a portion of said cord.

6. The extensible and self-retractable device of claim 4, wherein said spool member having a certain width length and said cavity extends within said spool member no more than half of the width length of said spool member.

7. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening, said housing having a first shell member and a second shell member, said shell members each having a pin member depending from an inside surface of said shell members, a first portion of said cord being wrapped around the pin member of said first shell member and a second portion of said cord being wrapped around the pin member of said second shell member;

a first disk member and a second disk member, said disk members each having a pin passageway and a cord passageway extending therethrough, a portion of said pin member disposed within its respective disk's pin passageway when said first shell member is attached to said second shell member;

a spool member having a first side surface and a second side surface, said spool member disposed within said housing, a middle portion of said spool member in conjunction with said first side surface and said second side surface defining a spring reel, said middle portion having a passageway extending therethrough for receiving a portion of each pin member when said first shell member is attached to said second shell member, and a spring disposed around said spring reel and attached at one end to said spring reel, a portion of said cord being disposed over said spring when said spring is disposed around said spring reel and said first shell member is attached to said second shell member.

8. An extensible and self-retractable device, for use with a cable or cord or the like disposed within said device, said device allowing a user to pull a portion of said cord out of said device and providing for automatic return of said portion within said device once said pull has been released, said extensible and self-retractable device comprising:

a housing having cord openings disposed at opposite ends of said housing, the first end and the second end of said cord extending out of said housing through its associated cord opening, said housing having a first shell member and a second shell member, each of said shell members having an aperture extending therethrough;

a first spring housing and a second spring housing, each spring housing having a body member and a cover plate member attached to each other to define an enclosed spring receiving area, said first spring housing and said second spring housing disposed within said housing;

a divider member having a cord receiving aperture extending therethrough, said first spring housing attached to one side of said divider member to define a first reel and said second spring housing attached to an opposite side of said divider member to define a second reel, said cord being inserted through said cord receiving aperture to allow a first portion of said cord to be disposed around said first reel and a second portion of said cord to be disposed around said second reel;

a first spring disposed within said first spring housing, at least one end of said first spring attached to said first spring housing; and a second spring disposed within said second spring housing, at least one end of said second spring attached to said second spring housing;

wherein said divider and at least one of said spring housings allowing a portion of said cord to be withdrawn out of one of said cord openings, the portion of said cord disposed within said housing before being withdrawn;

wherein said divider and at least one of said spring housings, in conjunction with its associated spring, automatically returning the portion of said cord withdrawn back into said housing when the pull on said cord is released.

9. The extensible and self-retractable device of claim 8, wherein a first end of said first spring is attached to a first pin member disposed within said first spring housing and a first end of said second spring is attached to a second pin member disposed within said second spring housing.

10. An extensible and self-retractable device, for use with a cable or cord or the like disposed within said device, said device allowing a user to pull a portion of said cord out of said device and providing for automatic return of said portion within said device once said pull has been released, said extensible and self-retractable device comprising:

a housing having cord openings disposed at opposite ends of said housing, the first end and the second end of said cord extending out of said housing through its associated cord opening, said housing having a first shell member and a second shell member, each of said shell members having an aperture extending therethrough;

a first spring housing and a second spring housing, each spring housing having a body member and a plate member attached to each other to define a spring receiving area, a divider member having a cord receiving aperture extending therethrough, said first spring housing attached to one side of said divider member to define a first reel and said second spring housing attached to an opposite side of said divider member to define a second reel, said cord being inserted through said cord receiving aperture to allow a first portion of said cord to be disposed around said first reel and a second portion of said cord to be disposed around said second reel;

a first spring disposed within said first spring housing, at least one end of said first spring attached to said first spring housing; and a second spring disposed within said second spring housing, at least one end of said second spring attached to said second spring housing;

wherein a first end of said first spring is attached to a first pin member disposed within said first spring housing and a first end of said second spring is attached to a second pin member disposed within said second spring housing;

wherein said first shell member, said second shell member and said plate members having apertures extending therethrough, said pin members each having cap receiving cavities, said device further including a first cap member and a second cap member, said cap members each having tip portions, wherein the tip portion of said first cap member being inserted through the aperture of said first shell member and the plate member of said first spring housing for mating with the cap receiving cavity of said first pin member, wherein the tip portion of said second cap member being inserted through the aperture of said second shell member and the plate member of said second spring housing for mating with the cap receiving cavity of said second pin member.

11. An extensible and self-retractable device, for use with a cable or cord or the like disposed within said device, said device allowing a user to pull a portion of said cord out of said device and providing for automatic return of said portion within said device once said pull has been released, said extensible and self-retractable device, comprising:

a housing having cord openings disposed at opposite ends of said housing, the first end and the second end of said cord extending out of said housing through its associated cord opening;

a spool member having a first side surface and a second side surface, a middle portion of said spool member in conjunction with said first side surface and said second side surface defining at least one cord reel, said cord reel having a uniform diameter throughout, said cord being wrapped around said cord reel, said spool member allowing a portion of said cord to be withdrawn from said housing out of one of said cord openings, the portion of said cord disposed within said housing before being withdrawn, said spool member disposed within said housing; and a spring disposed within said housing and operatively associated with said spool member, said spool member, in conjunction with said spring, also automatically returning the portion of said cord withdrawn back into said housing when the pull on said cord is released;

wherein a first end of said middle portion having a spring receiving cavity disposed therein, said spring being disposed within said spring receiving cavity;

wherein said spool member having a certain width length and said cavity extends within said spool member no more than half of the width length of said spool member.

* * * * *